April 28, 1953  F. M. GUY  2,636,360
RESILIENT BUSHING CARRIER
Filed Aug. 26, 1949
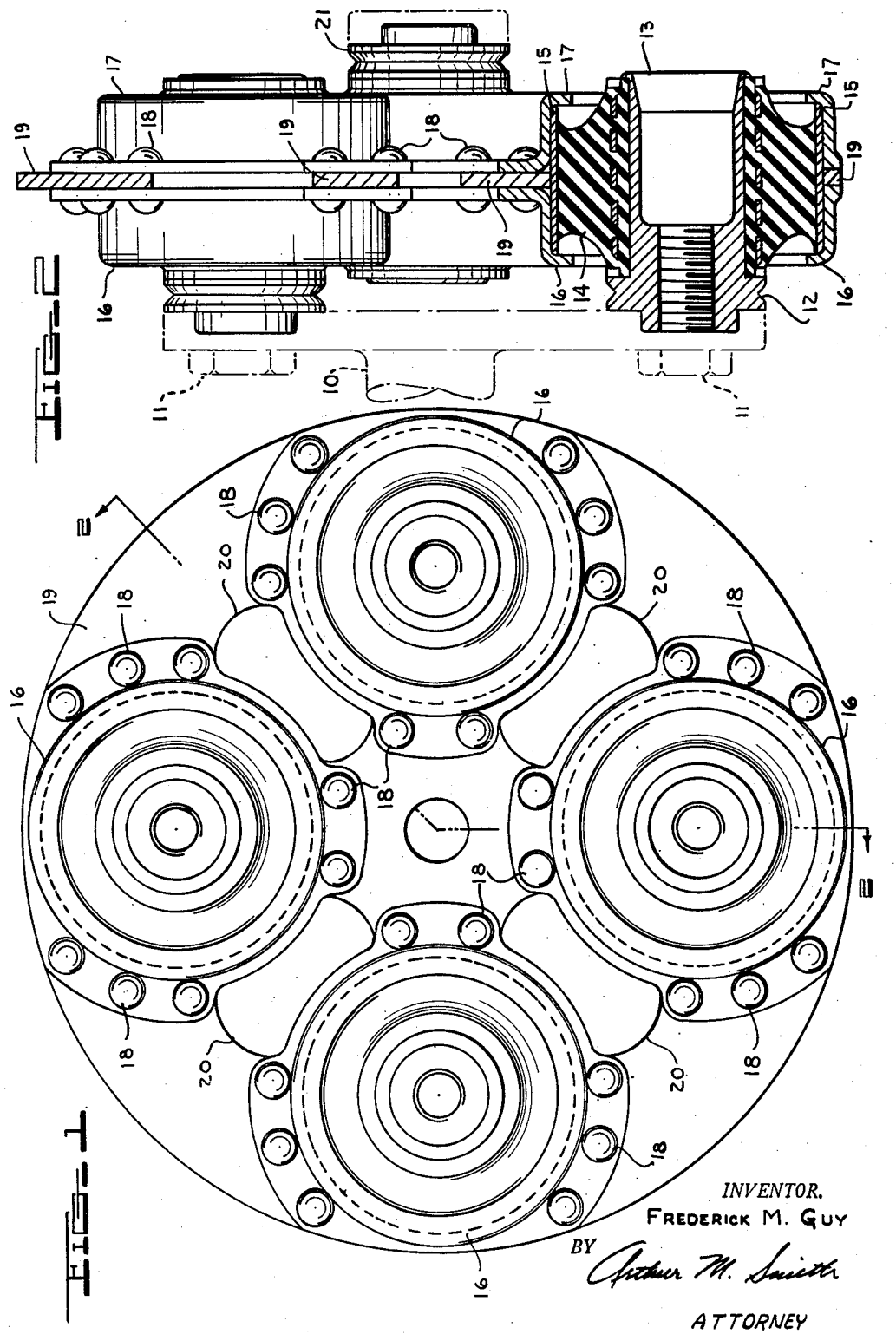
INVENTOR.
FREDERICK M. GUY
BY Arthur M. Smith
ATTORNEY Patented Apr. 28, 1953

2,636,360

UNITED STATES PATENT OFFICE 2,636,360

RESILIENT BUSHING CARRIER

Frederick M. Guy, Detroit, Mich., assignor to
U. S. Universal Joints Company, Detroit, Mich.,
a corporation of Michigan Application August 26, 1949, Serial No. 112,572

3 Claims. (Cl. 64—11)

The present invention relates to a resilient bushing carrier for use with a resilient coupling or universal joint of the type wherein a driving member is connected to a driven member through resilient bushings mounted in pockets or cups attached to a carrier member.

The resilient bushings used with the resilient couplings or universal joints above described are subjected to severe strains and frequently the resilient material therein is ruptured, thus causing failure of one of the bushings and decreasing the efficiency of the entire unit. This necessitates the disassembly of the unit and the replacement of the bushing. By forming the bushing carrier of spring steel or a like material which is characterized by its strength and high resiliency, much of the strain is taken from the resilient bushings and absorbed by said resilient carrier. Thus, bushing failure is reduced and a large saving in maintenance cost is effected. The steel used in the bushing carrier of the present invention is tempered to provide a material which can be distorted to a large extent without exceeding its limit of elasticity. It thus provides a part having the desired resiliency.

The device of the present invention is relatively inexpensive to manufacture since the only operations necessary are the punching operations for forming the rivet holes and the radial slots shown in the drawings. Many bushing carriers used with resilient couplings or universal joints of the type above described are formed with the pocket members, which are adapted for housing the resilient bushings, as a part thereof. By forming the resilient bushing housings or pockets as separate units, a large saving in cost is effected as a damaged pocket may be easily removed from the bushing carrier and replaced without replacing the entire bushing carrier.

In forming the pockets separate from the bushing carrier rather than as an integral part thereof, it is possible to use the same size bushings and pockets for carriers of different sizes, and thus additional stamping and dies are eliminated, effecting a further saving in cost of manufacture. If it is desired to attach a greater number of pockets and bushings to the carrier, it is merely necessary to punch additional holes.

A main object of the present invention is to provide a bushing carrier adapted for use with resilient couplings which is resilient so that said carrier can be displaced from its usual position when it receives a sudden shock or upon misalignment of the driving or driven member, and then return to its usual position, thus avoiding excessive strain on the carrier and the resilient bushings attached thereto.

Another object of the present invention is to provide a resilient bushing carrier adapted for use with resilient couplings which is relatively light and which requires a minimum amount of maintenance.

Another object of the present invention is to provide a resilient bushing carrier for resilient couplings which is extremely economical and simple to manufacture.

Other objects of this invention will appear in the following description and appended claims, reference being had to the accompanying drawings forming a part of this specification wherein like reference characters designate corresponding parts in the several views.

In the drawings:

Fig. 1 is a front elevation of a resilient coupling embodying the flexible bushing carrier of the present invention.

Fig. 2 is a sectional view taken along the line 2—2 in the direction of the arrows, Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A detailed description of the construction of the resilient bushings 13 referred to herein is disclosed in my co-pending application Serial No. 702,241, filed October 9, 1946, now Patent No. 2,505,766, issued May 2, 1950.

The drawings show a resilient coupling or universal joint commonly used on vehicles such as buses, wherein a driving member 10 is connected by the bolts 11 to the cores 12 of a plurality of resilient bushings 13. Each core 12 communicates with a body of resilient material 14 such as rubber, which in turn is bonded to a circumferential shell 15. The shell 15 is enclosed within pockets formed by the opposed identical stampings 16 and 17 and said stampings 16 and 17 are then secured by some means such as the rivets 18 to a central bushing carrier 19.

The bushing carrier 19 of the present invention is made of spring steel to provide resiliency withing the carrier itself. The carrier 19 is formed in the shape of a disc and is provided with radially extending holes 20 to reduce the overall weight of the carrier.

The driven member 21 is connected either to the center of the annular flexible carrier member 19, as shown, or to other resilient bushings 13 in the manner in which the driving member 10 is connected. Thus, power from the driving member 10 is transmitted through the resilient bushings 13 to the carrier 19 and from the carrier 19 to the driven member 21.

The flexible bushing carrier of the present invention will allow a freer universal movement in a resilient coupling or universal joint than is possible in the conventional rigid bushing carrier.

Due to the resiliency of the bushing carrier of the present invention, much of the strain is relieved from the resilient bushings in a resilient coupling or universal joint when the driving or driven member is misaligned or displaced from its usual position.

Further, since the bushings are detachably secured to the carrier, the cost of maintaining a resilient coupling embodying the present invention is reduced because bushings may be interchanged without replacing the carrier. Also, the same carrier blank may be varied during manufacture to accommodate various numbers of the same size bushing, thus providing units of varying load capacities from a small number of standard parts.

Having thus described a new and improved flexible bushing carrier for use with resilient couplings or universal joints, I claim:

1. A universal coupling for connecting a driving member and a driven member, said coupling comprising a resilient spring steel mounting plate, a plurality of resilient bushings, a plurality of rigid housings each comprising a pair of complemental cup members each having an open end surrounded by a circumferential flange portion, each pair of complemental cups holding one of said plurality of resilient bushings, and means connecting each pair of said complemental cups to said mounting plate to hold one of said resilient bushings thereon whereby relative displacement of the driving and driven members is partially accommodated by bodily displacement of said resilient bushings and rigid housings to the extent permitted by the resilient flexing of said mounting plate and is partially accommodated by distortion in said resilient bushings.

2. A universal coupling as claimed in claim 1 and further characterized in that said mounting plate is provided with cut out portions to reduce the weight thereof.

3. A universal coupling as claimed in claim 1 wherein said mounting plate is punched to provide a plurality of circumferentially spaced openings each adapted to receive one of the plurality of resilient bushings and to provide a plurality of openings for holding said means connecting said cups and said plate.

FREDERICK M. GUY.

References Cited in the file of this patent

UNITED STATES PATENTS

| Number | Name | Date |
|---|---|---|
| 2,101,078 | Lord et al. | Dec. 7, 1937 |
| 2,313,467 | Eilken | Mar. 9, 1943 |
| 2,386,017 | Venditty | Oct. 2, 1945 |
| 2,396,353 | Vanditty | Mar. 12, 1946 |

FOREIGN PATENTS

| Number | Country | Date |
|---|---|---|
| 524,477 | Great Britain | Jan. 12, 1942 |